No. 785,932. Patented March 28, 1905.

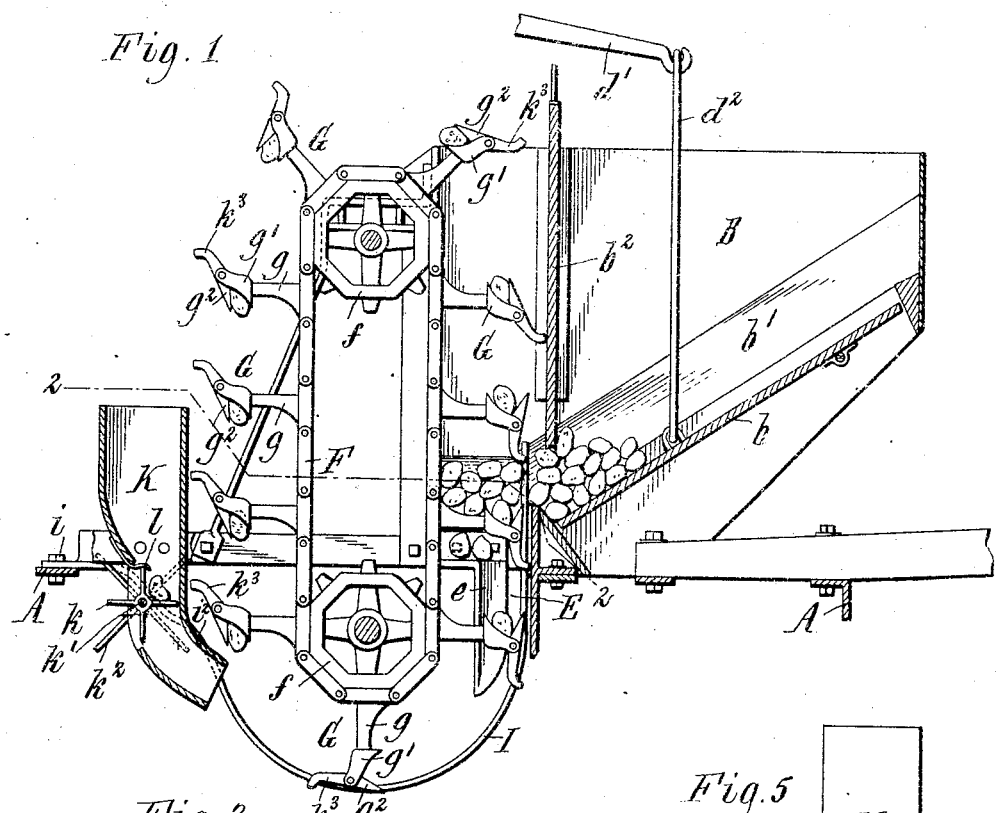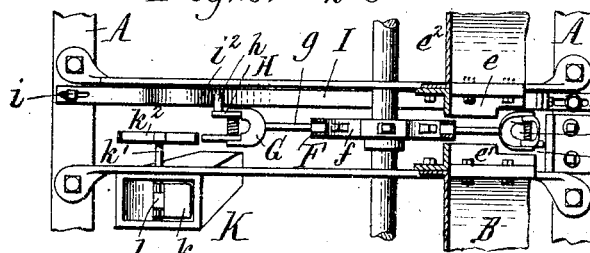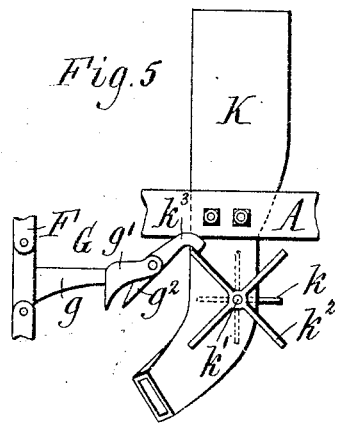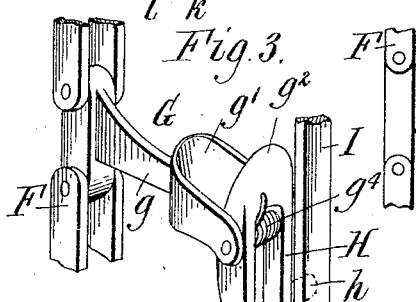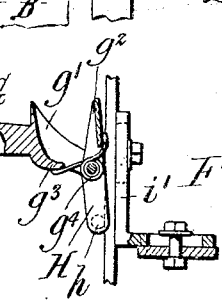

UNITED STATES PATENT OFFICE.

HENRY P. BALTZER AND JACOB JOHENGEN, OF HAMBURG, NEW YORK, ASSIGNORS TO HAMBURG PLANTER COMPANY, OF HAMBURG, NEW YORK.

POTATO-PLANTER.

SPECIFICATION forming part of Letters Patent No. 785,932, dated March 28, 1905.

Application filed August 29, 1904. Serial No. 222,504.

*To all whom it may concern:*

Be it known that we, HENRY P. BALTZER and JACOB JOHENGEN, citizens of the United States, residing at Hamburg, in the county of Erie and State of New York, have invented a new and useful Improvement in Potato-Planters, of which the following is a specification.

This invention relates to potato-planters of the kind described in United States Letters Patent No. 687,886, granted to Johengen and Fedick December 3, 1901, which comprise a potato-hopper and an endless elevator or carrier which takes the potatoes from the hopper and delivers them into the furrow at proper intervals; and the invention is more particularly directed to improvements in the potato delivery or feed mechanism of such machines. It is found to be very difficult in the use of these machines to deliver potatoes to the furrow one at a time at regular intervals and not drop two or more potatoes in some hills and skip other hills altogether. This is due to the fact that the cups of the elevator will at times take up two or more potatoes from the hopper, while at other times a cup will fail to receive any potatoes.

The primary object of this invention is to provide a potato delivery or feed mechanism which will operate reliably to deliver the potatoes singly one by one into the furrow at regular intervals, and to this end the elevator or carrier is provided with potato carriers or holders of a novel construction such that each holder can carry only one potato at a time.

Another object of the invention is to provide an auxiliary or supplemental potato-feed device which is supplied at all times with a potato and which in the event of one of the potato-holders failing to receive a potato from the hopper is actuated by the empty potato-holder to deliver its potato to the furrow at the proper time to take the place of the missing potato.

In the accompanying drawings, Figure 1 is a longitudinal sectional elevation of a potato-delivery mechanism for potato-planters embodying the invention. Fig. 2 is a horizontal section, partly in plan thereof, in line 2 2, Fig. 1. Fig. 3 is a fragmentary perspective view, on an enlarged scale, of a portion of the elevator and the guide for opening the potato-holders. Fig. 4 is a fragmentary elevation, partly in section, on an enlarged scale, of the parts shown in Fig. 3. Fig. 5 is a fragmentary rear elevation of the supplemental potato-feed device and one of the potato-holders.

Like letters of reference refer to like parts in the several figures.

A represents a portion of the main frame of a potato-planter, and B a potato-hopper having a bottom $b$, which is inclined rearwardly, and sides $b'$, which incline rearwardly and toward the bottom. The hopper is divided by a vertical slide or gate $b^2$ into a main chamber and an upright elevator-chamber, which communicates with the main chamber beneath the lower edge of the slide or gate, which is adjustable vertically to regulate the discharge of the potatoes into the elevator-chamber. The bottom board of the hopper is preferably movable, so that it can be vibrated, as by a hand-lever $d'$ and link $d^2$, to facilitate the discharge of the potatoes into the elevator-chamber. The bottom of the elevator-chamber terminates in a contracted slotted spout or tube E, formed, for instance, by separate plates or parts $e$ and $e'$, secured to and depending from the main frame. The upright rear wall $e^2$ of the elevator-chamber is also provided with a vertical slot in line with the slot of the spout, said slots allowing the elevator or endless carrier for the potatoes to travel upwardly through the spout and the elevator-chamber.

The elevator comprises an endless carrier chain or belt F, which passes around upper and lower chain or belt wheels $f$, mounted on shafts journaled in any suitable manner on the main frame. The carrier preferably consists of pivoted links, and the wheels are preferably of octagonal shape, having sides of substantially the same length as the chain-links. One of the shafts, with the chain-wheel, is positively driven to operate the elevator by suitable mechanism. (Not shown.)

The parts thus far described are constructed and operate substantially as described in said patent.

The elevator or endless carrier is provided with a series of potato holders or clamps G, each connected to the carrier-chain by relatively long arms $g$, which are rigidly secured to or formed on certain of the chain-links, preferably the alternate links. Each potato-holder (see Figs. 3 and 4) comprises a stationary jaw $g'$, which is rigid with the supporting-arm, and a movable jaw $g^2$, pivoted on the stationary jaw. The latter is of substantially U shape, having parallel outwardly-projecting sides connected by a bottom $g^3$, thus forming a receptacle or cup of a size sufficient to receive and hold one potato. The movable jaw is preferably pivoted between the outer ends of the sides of the stationary jaw on a pin connecting said sides and is pressed toward the stationary jaw to grasp and hold the potato by a spring $g^4$, which is coiled about the pivot-pin with its opposite ends bearing against the stationary and pivoted jaws. The pivoted jaw of each holder is provided with a projecting shank or stem H, having a laterally-extending pin or projection $h$.

I represents a stationary guide for opening the jaws of the potato-holders. In the construction illustrated it consists of a band or strip which passes around beneath the lower shaft of the elevator at one side of the path of the potato-holder and in the plane of movement of the lateral projections $h$ on the shanks of the pivoted jaws of the holders. The guide-strip is adjustably secured to the main frame, as by a bolt $i$, Fig. 2, passing through a slot in one end thereof, and a bracket $i'$, Fig. 4, attached to the other end thereof and secured to the main frame by a bolt passing through in the base of the bracket. The guide is provided on the descending side of the carrier or elevator with an offset or bend $i^2$, and the end of the guide on the ascending side of the elevator extends vertically up through the spout into the elevator-chamber of the hopper. The intermediate portion of the guide-strip is substantially concentric with the lower shaft of the elevator.

In operation the elevator or carrier is driven in a direction such that the potato-holders and their carrying-arms move upwardly through the elevator-chamber, thence downwardly and up around the lower wheel. As the potato-holders move downwardly on the descending side of the carrier the lateral projections $h$ of the pivoted jaws strike the offset portion $i^2$ of the guide I and swing the pivoted jaws on their pivots away from the stationary jaws to open the holders, which are held open by the projections $h$, sliding along the curved and vertical portions of the guide, until the holders move up into the elevator-chamber of the hopper and the projections disengage the upper end of the guide. As each open holder passes up through the slotted spout E it practically fills the latter and receives the potato, which would otherwise fall through the spout. The potato rests loosely in the hollow of the stationary jaw until the lateral projection $h$ of the pivoted jaw disengages the guide I, when the holder-jaws are closed by their spring and the potato is firmly grasped. The potatoes are thus positively held by the holders when they pass around the upper wheel of the elevator and downwardly in an inverted position. As each holder reaches and the projection $h$ of its pivoted jaw strikes the offset portion of the guide I the holder is opened and its potato dropped directly into the furrow or, if preferred, into any suitable device for guiding the potato into the furrow. The potatoes are thus dropped singly to the furrow at a predetermined distance apart.

It will be seen from Fig. 1 that as the open potato-holder moves up into the elevator-chamber of the hopper its fixed and pivoted jaws occupy, respectively, substantially horizontal and vertical positions, and the pivoted jaw moves laterally or in a direction at right angles to the line of movement of the holder and engages the side of the potato. As a result of the relative arrangement of the parts should two or more small potatoes lodge and pile up in the hollow fixed jaw of the holder the pivoted jaw instead of closing down on them and holding all of the potatoes acts to shove all but the lowermost potato sidewise off of the fixed jaw. The holder-arms are so thin or narrow and long that the potatoes cannot lodge thereon, and thus each holder carries up only a single potato. If the holder were located close to the carrier chain or belt and the pivoted jaw moved downwardly to grasp the potato, the tendency would be in the case of two or more small potatoes lodging in the holder to grasp and hold all of the potatoes at least until the holder was inverted, thereby either dropping a plurality of potatoes in one hill or dropping them at irregular intervals.

The supplemental potato-feed device comprises a small receptacle K, mounted on a suitable portion of the main frame, preferably adjacent to the descending run of the carrier, within convenient reach of the driver. The driver places in this receptacle a potato, which remains therein unless one of the potato-holders fails to take a potato from the hopper, in which event the empty holder engages and operates a discharge device or gate $k$ of the supplemental receptacle and drops the potatoes therefrom. In the construction illustrated the discharge-gate is journaled to rotate on the receptacle and has cross-plates, one of which in the normal position of the gate extends into and closes the discharge-throat of the receptacle. The shaft $k'$ of the gate is furnished with operating cross-arms $k^2$, located in the plane of movement of fingers $k^3$, projecting from the pivoted jaws of the several potato-holders. When a holder carries a potato, its finger $k^3$ occupies a position such that it will pass and not engage the operating-arms $k^2$ of the gate of the supplemental receptacles. (See Figs. 1 and 2.) When, however, a potato-holder fails to receive a potato, its pivoted jaw is tilted on its pivot by its spring to such a position that its finger $k^3$ will engage one of the operating-arms $k^2$ of the discharge-gate $k$ and turn the same through a quarter-revolution, thereby dropping the potato from the supplemental receptacle at the proper time to take the place of the missing potato. The discharge-gate of the supplemental feed device is preferably releasably held in its normal position by a spring $l$, which is secured to the receptacle K and bears yieldingly against one of the plates of the discharge-gate.

While a rotatable gate of the character just described is considered desirable, any other suitable discharge gate or device operated by the empty potato-holder could be employed.

We claim as our invention—

1. In a potato-feed mechanism, the combination of a hopper, an endless carrier, potato-holders connected to said carrier by relatively long thin arms and each comprising a hollow jaw fixed on and projecting from one of said arms, and a jaw pivoted to said fixed jaw to swing toward the latter in a direction substantially at right angles to the direction of movement of the holder with the carrier, and means for opening and closing said potato-holders, substantially as set forth.

2. In a potato-feed mechanism, the combination of a hopper, an endless carrier, potato-holders connected to said carrier by relatively long thin arms and each comprising a hollow jaw fixed on one of said arms and having sides which project outwardly from the arm, and a jaw pivoted to the outer ends of the sides of the fixed jaw to swing toward and from the arm carrying the holder, and means for opening and closing the potato-holders, substantially as set forth.

3. In a potato-feed mechanism, the combination of a hopper, an endless carrier, potato-holders connected to said carrier by relatively long thin arms and each comprising a jaw fixed on and projecting from one of said arms, and a jaw pivoted to the outer portion of said fixed jaw to swing toward and from the arm carrying the holder, a spring for closing said jaws, and a stationary guide which is engaged by a part of said pivoted jaw to open the jaws, substantially as set forth.

4. The combination with a carrier provided with a potato-holder having a movable part, of a potato-receptacle, a discharge device therefor, and a part which is engaged by said movable part of the potato-holder when in one position to operate said discharge device to discharge a potato, substantially as set forth.

5. The combination with a carrier provided with a potato-holder having a movable jaw, of a potato-receptacle, a discharge-gate therefor provided with an operating-arm, and a finger connected to the movable jaw of the potato-holder which in one position of said jaw engages said arm and operates said gate to discharge a potato, substantially as set forth.

6. The combination with a hopper, and a carrier provided with potato-holders which have movable jaws and take the potatoes from said hopper, of a potato-receptacle, a pivoted discharge-gate therefor provided with radial operating-arms, and projecting fingers on said movable jaws of the potato-holders which in one position of said jaws engage said arms and operate said gate to discharge the potatoes from said receptacle, substantially as set forth.

Witness our hands this 9th day of August, 1904.

HENRY P. BALTZER.
JACOB JOHENGEN.

Witnesses:
CHAS. W. PARKER,
EDWARD C. HARD.